United States Patent [19]
Fukuoka et al.

[11] Patent Number: 5,995,711
[45] Date of Patent: Nov. 30, 1999

[54] HEATING HEAT EXCHANGER WITH ELECTRIC HEAT EMITTER

[75] Inventors: Mikio Fukuoka, Bisai; Mitsugu Nakamura; Michiyasu Yamamoto, both of Chiryu, all of Japan

[73] Assignee: Denso Corporation, Kariya, Japan

[21] Appl. No.: 09/129,665

[22] Filed: Aug. 5, 1998

[30] Foreign Application Priority Data

Aug. 6, 1997 [JP] Japan ................................. 9-211954

[51] Int. Cl.$^6$ .............................. F24D 13/00; B60L 1/02
[52] U.S. Cl. ...................... 392/347; 392/485; 219/202; 219/504; 219/505; 219/540
[58] Field of Search .................... 392/347, 360, 392/355, 485; 219/540, 504, 202

[56] References Cited

U.S. PATENT DOCUMENTS

| | | | |
|---|---|---|---|
| 4,899,032 | 2/1990 | Schwarlz et al. | 219/540 |
| 5,057,672 | 10/1991 | Bohlender et al. | 219/540 |
| 5,192,853 | 3/1993 | Yeh | 119/540 |
| 5,239,163 | 8/1993 | Brouwers | 219/202 |
| 5,256,857 | 10/1993 | Curhan et al. | 219/202 |
| 5,665,261 | 9/1997 | Damsohn et al. | 219/504 |

FOREIGN PATENT DOCUMENTS

| | | |
|---|---|---|
| 63-203411 | 8/1988 | Japan . |
| 5-69732 | 3/1993 | Japan . |
| 6-75819 | 10/1994 | Japan . |

*Primary Examiner*—Philip H. Leung
*Assistant Examiner*—Vinod D Patel
*Attorney, Agent, or Firm*—Harness, Dickey & Pierce, PLC

[57] ABSTRACT

A heat-exchanging core portion includes a plurality of tubes arranged in parallel and a plurality of fin members disposed between a pair of adjacent tubes. While an electric heat emitting unit is constructed by supporting a heat emitting body including a heat emitting element inside a frame through a fin member. The electric heat emitting unit is installed into a space, which is defined in the heat-exchanging core portion, having a predetermined distance after the heat-exchanging core portion is assembled and integrally brazed while defining the space.

12 Claims, 5 Drawing Sheets

5,995,711

HEATING HEAT EXCHANGER WITH ELECTRIC HEAT EMITTER

CROSS REFERENCE TO RELATED APPLICATION

This application is based on and incorporates herein by reference Japanese Patent Application No. Hei 9-211954 filed on Aug. 6, 1997.

BACKGROUND OF THE INVENTION

1. Field of the Invention

The present invention relates to a heat exchanger for heating a passenger compartment of a vehicle by carrying out heat exchange between air and hot water (engine coolant), to which an electric heat emitter is attached.

2. Description of Related Art

A heating heat exchanger to which an electric heat emitter is attached is disclosed in JP-A-63-203411 and JP-U-6-75819. According to this heating heat exchanger, the electric heat emitter is integrated with the heat exchanger to heat air by carrying out heat exchange between the air and hot water (engine coolant). In the heating heat exchanger, when the hot water temperature is low as in right after a vehicle engine starts, an electric current is supplied to the electric heat emitter. Then, the heat generated by the electric heat emitter radiates to the air through corrugated fins of the heat exchanger, and the air is heated.

However, according to the heating heat exchanger disclosed in JP-A-5-69732, because the electric heat emitter including a heat emitting element and electrode plates is brazed with a core portion of the heat exchanger, the electric heat emitter is exposed to a high temperature condition (about 600° C., in case an aluminum brazing process is carried out). As a result, the electric characteristic of the heat emitter is deteriorated.

Further, according to JP-U-6-75819, the electric heat emitter is installed in a concave portion formed on an air downstream side surface of the plate fin, in a plate fin type heating heat exchanger. In this plate fin type heat exchanger, a cylindrical tube is mechanically expanded to connect to the plate fin. Therefore, a heat resistance at the connecting portion becomes large, thereby decreasing the heat conductive efficiency of the heat exchanger.

Further, the concave portion is additionally formed on the plate fin for installing the electric heat emitter, thereby increasing the manufacturing cost of the heat exchanger.

SUMMARY OF THE INVENTION

A first object of the present invention is to provide a heating heat exchanger with an electric heat emitting unit, in which a deterioration of the electric characteristic of the electric heat emitting unit can be avoided.

A second object of the present invention is to provide a heating heat exchanger with an electric heat emitting unit, in which the electric heat emitting unit can be easily installed in the core portion of a corrugated fin type heat exchanger having a high heat exchanging performance.

According to the present invention, an electric heat emitting unit is constructed by supporting a heat emitting body including a heat emitting element inside a frame through a fin member. Further, the electric heat emitting unit is installed into a space having a predetermined distance, which is defined in the heat-exchanging core portion, after the heat-exchanging core portion is assembled while defining the space.

Thereby, the electric heat emitting unit can be installed into the space in the heat-exchanging core portion after the heat-exchanging core portion is assembled, that is, after an integrally brazing process of the heat-exchanging core portion, is completed. Thus, the electric characteristic of the electric heat emitting unit is not deteriorated when the heat-exchanging core portion is brazed.

The electric heat emitting unit is previously constructed as a unit in which the heat emitting body and the fin member are integrally supported inside the frame. The heat-exchanging core portion is a corrugated fin type core portion. Thus, the electric heat emitting unit can be easily installed into the heat-exchanging core portion only by not providing a specified oval flat tube and corrugated fin corresponding to the thickness of the electric heat emitting unit.

Accordingly, an additional concave portion as in the conventional plate fin type heat exchanger is not needed, thus the electric heat emitting unit can be easily installed into the heat-exchanging core portion while attaining a high heat exchanging performance of the corrugated fin type heat exchanger.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS

Figure 1:
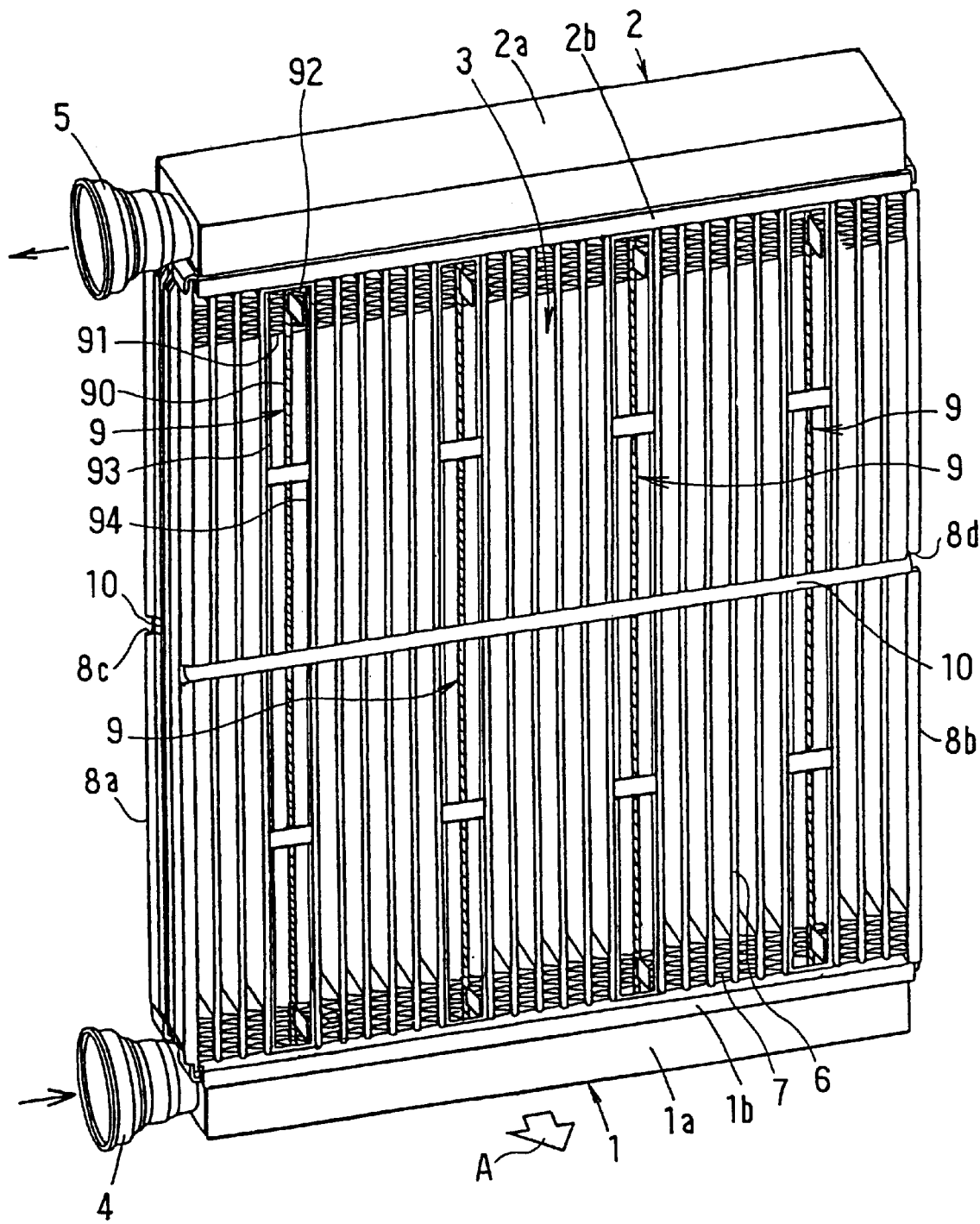
FIG. 1 is a perspective view showing a heater core with an electric heat emitting unit according to a first embodiment.

Referring to the drawings, preferred embodiments of the present invention will be described.

First Embodiment

FIG. 1 shows a heater core to which an electric heat emitting unit 9 is connected. The heater core includes a hot-water inlet tank 1, a hot-water outlet tank 2 and a heat-exchanging core portion 3 disposed between the hot-water inlet and outlet tanks 1, 2.

An inlet pipe 4 is provided at the hot-water inlet tank 1 for introducing a hot water (engine coolant) from an engine of a vehicle into the heater core. An outlet pipe 5 is provided at the hot-water outlet tank 2 for discharging the hot water out of the heater core and recirculating the hot water to the engine. Here, the heater core is, as shown in FIG. 1, symmetrical in the upper and lower direction.

Figure 2:
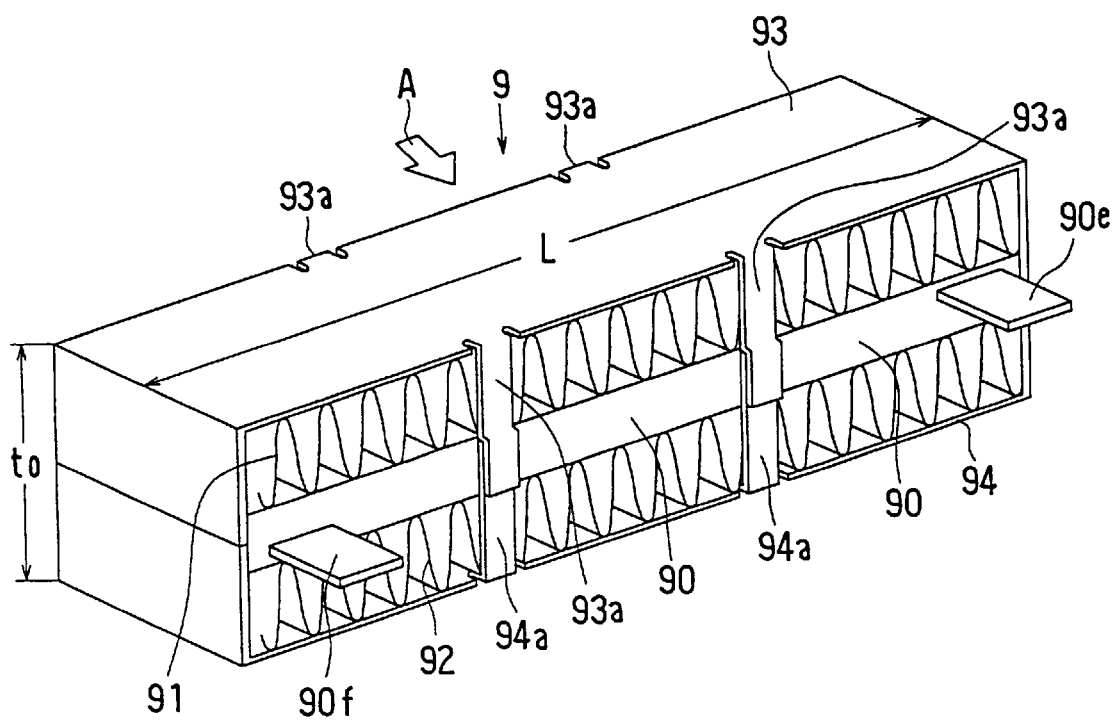
FIG. 2 is a perspective view showing the electric heat emitting unit according to the first embodiment.
Figure 3:
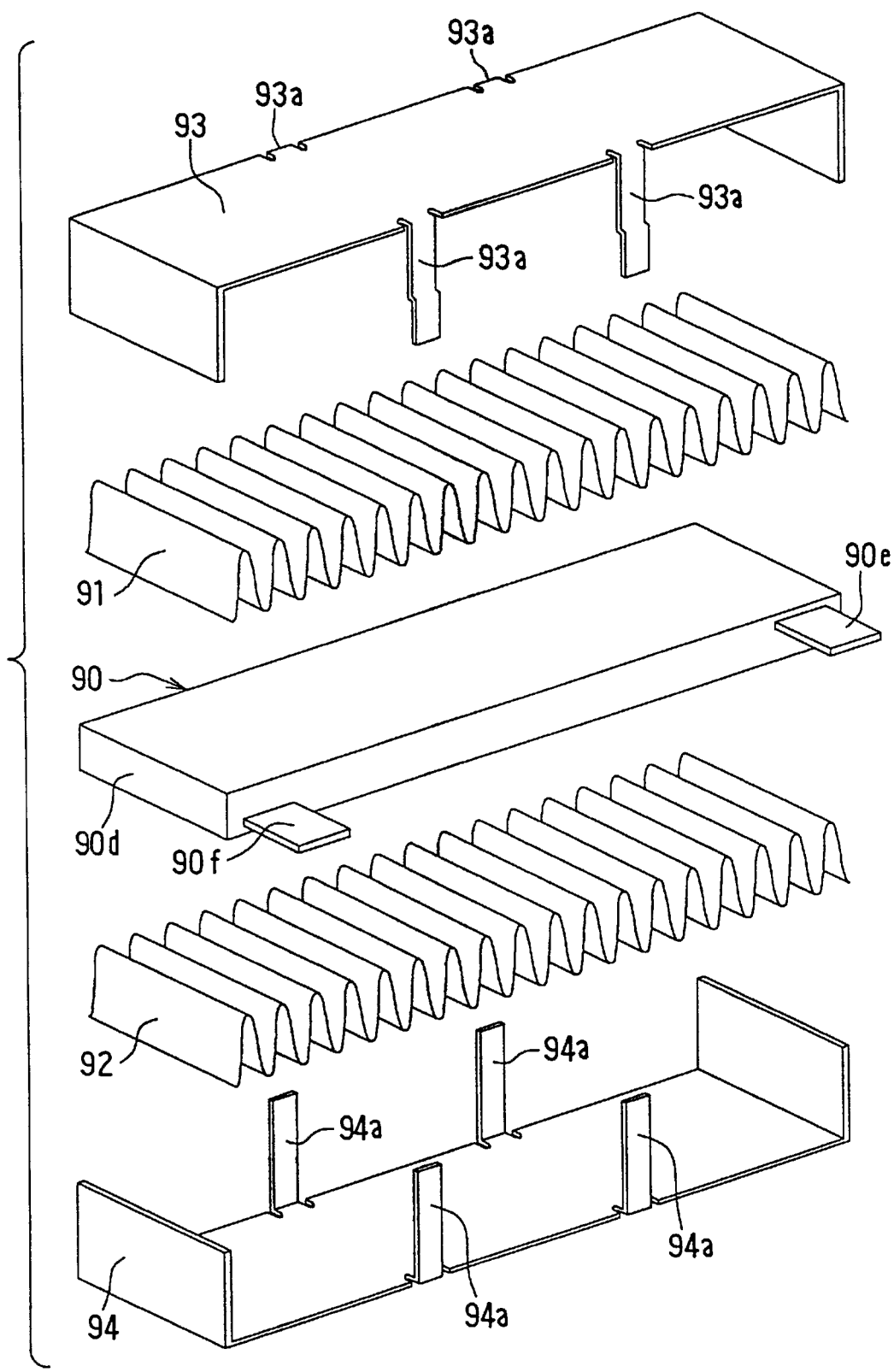
FIG. 3 is an exploded view of the electric heat emitting unit according to the first embodiment.
Figure 4A:
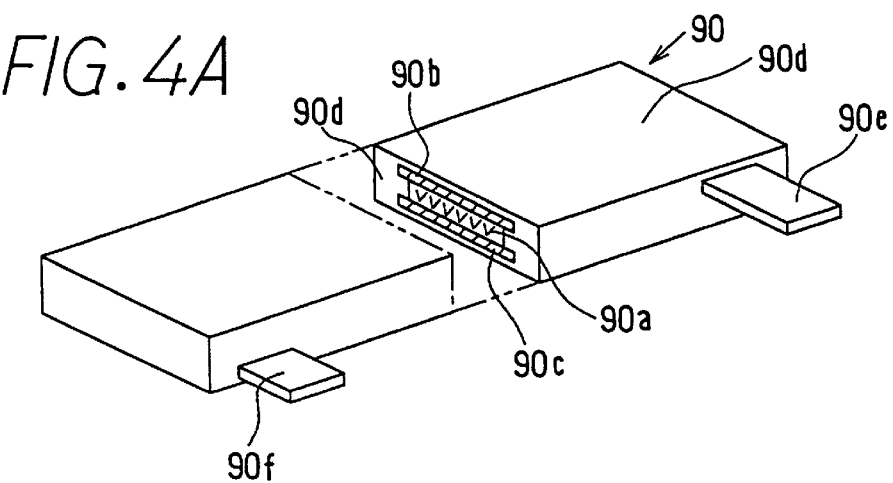
FIG. 4A is a cross-sectional perspective view showing a heat emitting body of the electric heat emitting unit.
Figure 4B:
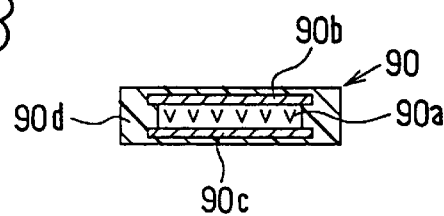
FIG. 4B is a latitudinal cross-sectional view of the heat emitting body.
Figure 4C:
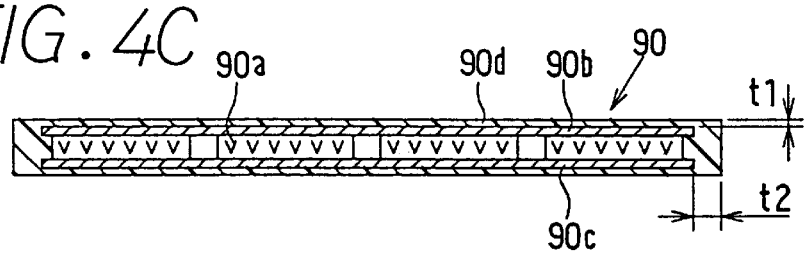
FIG. 4C is a longitudinal cross-sectional view of the heat emitting body.
Figure 4D:
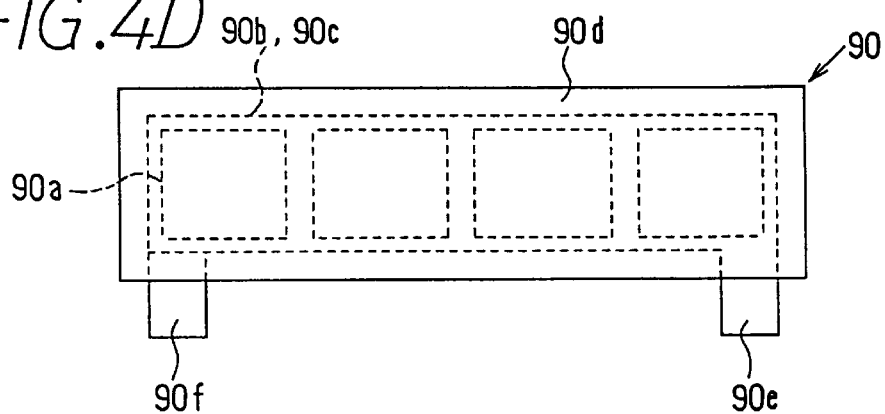
FIG. 4D is a plan view showing the heat emitting body.

The hot-water inlet tank 1 is constructed by a tank portion 1a and a sheet metal 1b which covers the opening surface of the tank portion 1a. In a similar way, the hot-water outlet tank 2 is constructed by a tank portion 2a and a sheet metal 2b. The hot-water inlet and outlet tanks 1, 2, as is well known, extend longitudinally in the right and left direction in FIG. 1. In the sheet metals 1b, 2b, a plurality of tube insertion holes (not illustrated) are formed in parallel in the right and left direction in FIGS. 1, 2.

In the heat-exchanging core portion 3, a plurality of oval flat tubes 6 are disposed in parallel in the right and left direction in FIG. 1. Each oval flat tube 6 is formed into an oval flat shape in cross section, and the longitudinal axis thereof is parallel to the flow direction A of the air to be heated. Corrugated fins 7 are provided between a pair of adjacent oval flat tubes 6 out of plural oval flat tubes 6. Each corrugated fin 7 is formed into a wave shape and has a plurality of louvers (not illustrated) formed at a predetermined angle with respect to the air-flow direction for improving heat transmitting efficiency.

Both ends of the oval flat tube 6 are inserted into the tube insertion holes of the sheet metals 1b, 2b, and connected thereto. Side plates 8a, 8b are disposed outside (both ends in the right and left direction in FIG. 1) of the outermost corrugated fin 7 of the heat-exchanging core portion 3. The side plates 8a, 8b are connected to the outermost corrugated fin 7 and the sheet metals 1b, 2b.

According to the present embodiment, the above-described components 1 through 8b of the heater core are made of aluminum alloy, and are connected integrally by a brazing process using a brazing material clad on the aluminum alloy.

Electric heat emitting units 9 are installed into at the predetermined positions of the heat-exchanging core portion 3. For example, as shown in FIG. 1, four electric heat emitting units 9 are installed into the heat-exchanging core portion 3 by predetermined pitches. For installing each electric heat emitting unit 9, the oval flat tube 6 and the corrugated fins 7 connected to both sides of the oval flat tube 6 which are placed at the predetermined position of the heat-exchanging core portion 3 are not disposed before the heater core is brazed. After the brazing process is completed, the electric heat emitting unit 9 is installed into the predetermined position where the tube 6 and the corrugated fins 7 are not disposed.

Therefore, the thickness $t_0$ (FIG. 2) of the electric heat emitting unit 9 is set to the sum of the thickness of the oval flat tube 6 and the corrugated fins 7 connected to both sides of the oval flat tube 6. Further, the length L thereof is set to the same length between the sheet metals 1b, 2b.

As shown in FIGS. 2–4D, the electric heat emitting unit 9 is constructed by a heat emitting body 90, corrugated fins 91, 92, and frames 93, 94. In the heat emitting body 90, as shown in FIGS. 4A–4D, a rectangular plate-like heat emitting element 90a is sandwiched between rectangular shaped electrode plates 90b, 90c.

The electrode plates 90b 90c are in all round covered by an insulator 90d. Here, the heat emitting element 90a is a PTC element made of a resistant material (for example, barium tinanate) of which resistant value abruptly increases at a predetermined temperature $T_0$ (for example, about 90° C.), and the thickness of which is about 1.0–2.0 mm. The PTC element 90a generates heat when electric current is supplied to the electrode plates 90b, 90c.

The electrode plates 90b, 90c are made of a conductive metal such as aluminum, copper, or stainless, and the thickness thereof is about 0.1–0.5 mm. The longitudinal lengths (length in the right and left direction in FIG. 1) of both electrode plates 90b, 90c are the same as the length L of the electric heat emitter unit 9. The heat emitting elements 90a are arranged at the plural positions (for example, four positions as shown in FIG. 4) in the longitudinal direction of the electrode plates 90b, 90c. The heat emitting element 90a and the electrode plates 90b, 90c are press-connected to each other to have electrically conductivity.

The electric heat emitting body 90 is installed inside the frames 93, 94 in such a manner that the insulator 90d press-contact the ridge portion of the wave shaped corrugated fins 91, 92. The insulator 90c electrically insulates the corrugated fins 91, 92 from the electrode plates 90b, 90c. The thickness t1 of the insulator 90d located between the corrugated fins 91, 92 and the electrode plates 90b, 90c is set to be thin, for example $25\mu$–$100\mu$, for conducting the heat from the heat emitting element 90a to the corrugated fins 91, 92.

While, the thickness t2 of the insulator located at the side of the heat emitting element 90a is set to be thick, for example 1.0–2.0 mm, for protecting the heat emitting element 90a. The insulator 90d is, for example, made of heat resisting resin such as polyimide resin.

The electrode plate 90b functions as a positive side electrode plate, and has a terminal portion 90e connecting to an outside electric circuit. In a similar way, the electrode plate 90c functions as a negative side electrode plate, and has a terminal portion 90f. In the present embodiment, the terminal portions 90e, 90f protrude toward the rear side (downstream side of the air-flow A) of the heat-exchanging core portion 3. Here, in the vehicle air conditioning apparatus, a cooling heat exchanger (evaporator) is generally disposed at the air upstream side of the heating heat exchanger (heater core), thus drain water condensed in the cooling heat exchanger spreads toward the heating heat exchanger along with the air-flow and may stick to the air upstream side of the heating heat exchanger. Therefore, it is preferable to protrude the terminal portions 90e, 90f toward the air downstream side of the heat-exchanging core portion 3 to avoid the stickness of the drain water to the terminal portions 90e, 90f.

As shown in FIG. 4, the terminal portion 90e is formed at the right end of the positive side electrode plate 90b, and the terminal portion 90c is formed at the left end of the negative side electrode plate 90c. The terminal portions 90e, 90f are connected to an outside controlling circuit (not illustrated). The electric current from a vehicle battery is supplied to each electric heat emitting unit 9 through the outside controlling circuit.

The corrugated fins 91, 92 are wave-shaped as the corrugated fin 7, and made of metal superior in the heat conductivity such as aluminum. The frames 93, 94 are formed into U-shape, and made of metal superior in the heat conductivity such as aluminum or stainless. Each frame 93, 94 includes attaching nails 93a, 94a at both sides (both upstream and downstream sides of the air-flow A) thereof. These attaching nails 93a, 94a are formed by bending process.

The frames 93, 94 are integrally connected to each other by lapping the tip portion of the attaching nail 93a over the tip portion of the attaching nail 94a, and then welding or brazing this lapped portion together. The heat emitting body 90 and the corrugated fins 91, 92 are supported inside the connected frames 93, 94 by pressing the frames 93, 94 relative to the heat emitting body 90 and the corrugated fins 91, 92.

A tightening (band) member 10 is made of anticorrosion metal such as stainless, and arranged both air upstream side surface and air downstream side surface of the heat-exchanging core portion 3. The tightening member 10 includes bent-shaped hanging portions at both ends. The tightening member 10 is fastened between the side plates 8a, 8b by hanging the hanging portions on grooves 8c, 8d formed at the central positions of the side plates 8a, 8b.

The tightening member 10 tightens the heat-exchanging core portion 3, thus the electric heat emitting unit 9 is press supported between two oval flat tubes 6 adjacent to the electric heat emitting unit 9. Here, in FIG. 1, the tightening member 10 is fastened at the only central position, in the upper and lower direction, of the heat-exchanging core portion 3. Alternatively, plural tightening members 10 may be fastened at plural positions, in the upper and lower direction, of the heat-exchanging core portion 3.

Next, a manufacturing method of the heater core will be explained.

First, a core assembling step, in which each component of the heater core shown in FIG. 1 is assembled, is carried out. In the core assembling step, the tubes 6 and the corrugated fins 7 are alternately laminated to form the heat-changing core portion 3. At this time, in a specified position where the electric heat emitting unit 9 is installed, two oval flat tubes 6 adjacent to each other are arranged to have a predetermined distance. A dummy plate (not illustrated) is inserted into between the pair of adjacent oval flat tubes 6 for maintaining the predetermined distance. This dummy plate is made of heat resisting material, such as carbon, having a durability in a brazing furnace and a characteristic not to be aluminum-brazed.

Next, the assembled heater core is supported by a jig (not illustrated) for maintaining the assembled structure thereof, and carried into the brazing furnace to be integrally brazed. The assembled heater core is heated to the melting point (about 600° C.) of the brazing material to braze each component together.

After the brazing step is completed, the assembled heat exchanger is carried out of the brazing furnace. The assembled heat exchanger is cooled to the ordinary temperature, then the electric heat emitting unit 9 is installed.

The electric heat emitting unit 9 is assembled independently from the assembled heater core. That is, the plate shaped heat emitting element 90a is sandwiched between the electrode plates 90b, 90c, and the electrode plates 90b, 90c are covered in all round by the insulator 90d, to form the heat emitting body 90. The corrugated fins 91, 92 are disposed at both sides of the heat emitting body 90, and after that, the frames 93, 94 cover the corrugated fins 91, 92 from the outside. Finally, the frames 93, 94 are connected together to form the electric heat emitting unit 9 shown in FIG. 2.

Next, the dummy plate is removed from the space between the pair of adjacent tubes 6, and the electric heat emitting unit 9 is installed into the space where the dummy plate was removed in such a manner that the outside surface of the frames 93, 94 contact the outer surface of the adjacent tube 6. After that, the tightening member 10 is fastened to the side plates 8a, 8b by hanging the hanging portion on the grooves 8c, 8d, for tightening the heat-exchanging core portion 3.

In this way, a tightening force acts on the heat-exchanging core portion 3 to press contact the electric heat emitting unit 9 to the pair of adjacent tubes 6, for fixing the electric heat emitting unit 9 between the pair of adjacent tubes 6.

Next, an operation of the above-described structure will be described.

When a heating operation is carried out, a blower fan (not illustrated) generates an air flow, causing air to flow inside a air-conditioning unit casing. The air passes through the space between the oval flat tube 6 and the corrugated fin 7 and the space inside the frames 93, 94 of the electric heat emitting unit 9 as denoted by the arrow A. As a water pump of the vehicle engine operates, hot water flows from the engine into the inlet tank 1 of the heater core through the inlet pipe 4.

The hot water in the inlet tank 1 is distributed into the plural oval flat tubes 6 and flows inside the tubes 6 while radiating its heat to the air. The hot water, after flowing through the plural tubes 6, is collected in the outlet tank 2, and there after flows out of the heater core through the outlet pipe 5 to return to the engine.

During the heating operation, when the hot water temperature is lower than a predetermined temperature (for example, 80° C.), the outside controlling circuit controls such that electric voltage is supplied from the vehicle battery to the terminal portions 90e, 90f of the electrode plates 90b, 90c. Thereby, the electric current is supplied to the heat emitting element 90a, and the heat emitting element 90a generates heat. The heat generated by the heat emitting element 90a is conducted to the air to be conditioned through the electrode plates 90b, 90c, the insulator 90d, and the corrugated fins 91, 92. Accordingly, even when the hot water temperature is low, the air is heated quickly.

Here, the resistant value of the PTC heater increases abruptly at the predetermined temperature $T_0$. Thus, the PTC heater can self-control its heat generating temperature up to the self-control set temperature $T_0$.

In each electric heat emitting unit 9, the corrugated fins 91, 92 contact the adjacent oval flat tubes 6 through the frames 93, 94 while being capable of transmitting the heat. Thus, even when the electric current is not supplied to the heat emitting body 90a, the heat of the hot water is conducted from the oval flat tube 6 to the corrugated fins 91, 92. Therefore, even when the heat emitting element generates no heat, the temperature of the blown air around the heat emitting element 90a hardly decreases.

Further, in each electric heat emitting unit 9, the electrode plates 90b, 90c are electrically insulated from the corrugated fins 91, 92, and the frames 93, 94 made of metal by the insulator 90d. Therefore, an electric current supplied to the electric heat emitting unit 9 does not flow through the heater core. Accordingly, each part of the heater core is prevented from electrically corroding.

Second Embodiment

Figure 5:
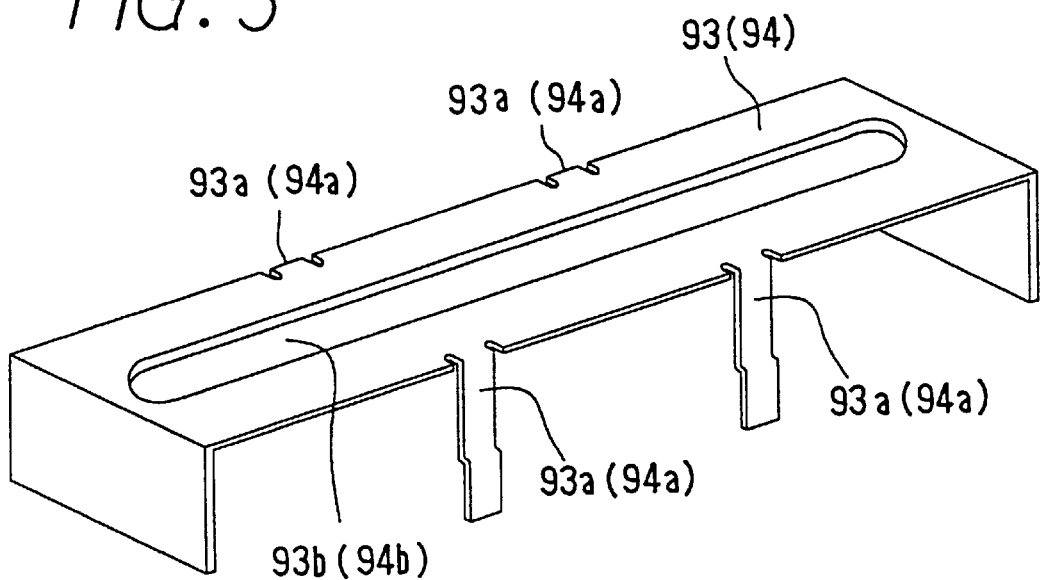
FIG. 5 is a perspective view showing a frame of an electric heat emitting unit according to a second embodiment.

In a second embodiment, as shown in FIG. 5, each frame 93, 94 includes a rib 93b, 94b extending in the longitudinal direction of the frame 93, 94. The rib 93b, 94b is convex-shaped and press formed toward the inside of the frame 93, 94. Thereby, the corrugated fins 91, 92 more firmly contact the heat emitting body 90, and the heat conductive efficiency from the heat emitting body 90 to the corrugated fins 91, 92 is improved.

Third Embodiment

Figure 6:
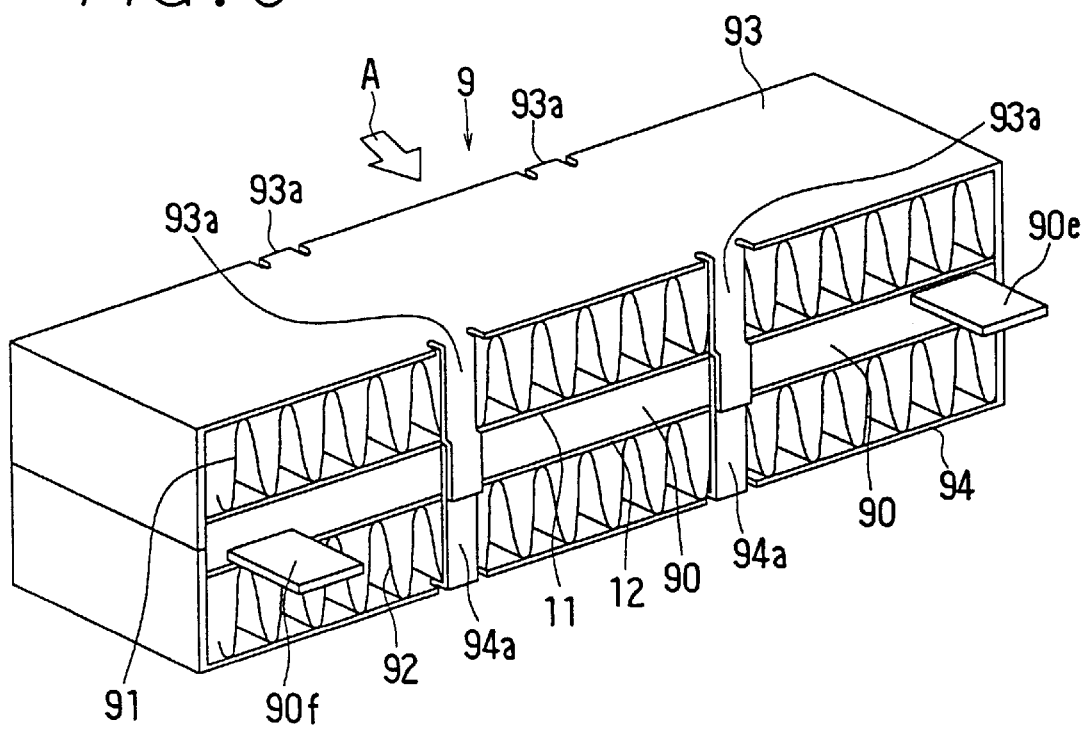
FIG. 6 is a perspective view showing an electric heat emitting unit according to a third embodiment.

According to a third embodiment, as shown in FIG. 6, metal thin plates 11, 12 are provided between the heat emitting body 90 and the ridge portions of the corrugated fins 91, 92, for improving the heat conductive efficiency from the heat emitting body 90 to the corrugated fins 91, 92. The metal thin plate is, for example, made of aluminum and the thickness of which is about 1.0–0.5 mm.

In this third embodiment, because the heat of the heat emitting element 90a is conducted to the metal thin plates 11, 12 through the insulator 90d, the temperatures of the metal thin plates are entirely increased. Thus, the heat conducting performance from the metal thin plates 11, 12 to the corrugated fins 91, 92 is improved.

Modifications

In the above-described embodiments, when both frames 93, 94 are connected to each other, the tip portions of the attaching nails 93a, 94a may be connected by mechanical connecting process such as crimping. Or, the edge portions of the frames 93, 94 (the edge portions of the U-shaped boxes) may be connected directly by welding, brazing, or crimping.

The electric heat emitting unit 9 may be installed between the oval flat tube 6 and the corrugated fin 7, or may be installed between the adjacent corrugated fins 7.

Further, in the above-described embodiments, the heater core is applied to the vehicle air conditioning apparatus. However, the heater core of the present invention is not limited to be applied to the vehicle air conditioning apparatus, and may be applied for different technical fields.

Further, an installed layout of the electric heat emitting unit 9 is not limited to a layout in FIG. 1, and may be changed in accordance with the specification change of the heater core.

Further, an adhesive resin may be used as the insulator 90d for making the heat emitting body adhere to the corrugated fins 91, 92 or the metal thin plates 11, 12.

What is claimed is:

1. A heating heat exchanger for heating air passing through said heating heat exchanger, said heating heat exchanger comprising:

a heat-exchanging core portion having a plurality of tubes arranged in parallel and a plurality of heat exchanging fin members disposed between a pair of adjacent tubes out of said tubes;

a heat source fluid flowing in said plurality of tubes, said heat source fluid transmitting heat to said air passing through said heating heat exchanger using said plurality of heat exchanging fin members; and an electric heat emitting unit installed in said heat-exchanging core portion, said electric heat emitting unit constructed by supporting a heat emitting body including a heat emitting element inside a frame through a heat unit fin member, said electric heat emitting unit transmitting heat to said air passing through said heating heat exchanger using said heat unit fin member.

2. A heating heat exchanger according to claim 1, wherein said electric heat emitting unit is installed into a space, which is defined in said heat-exchanging core portion, having a predetermined distance after said heat-exchanging core portion is assembled while defining said space.

3. A heating heat exchanger according to claim 1, wherein said frame is made of a material superior in heat conductivity performance.

4. A heating heat exchanger according to claim 2, wherein said electric heat emitting unit is installed into the space defined by a pair of adjacent tubes.

5. A heating heat exchanger according to claim 1, wherein said heat emitting body is electric ally insulated from said heat unit fin member in said electric heat emitting unit.

6. A heating heat exchanger according to claim 1, wherein said heat emitting body further includes a positive electrode plate and a negative electrode plate, and said heat emitting element is disposed between the positive and negative electrode plates, said electrode plates are covered in all round by an insulator made of electrically insulating material, said heat unit fin member of said electric heat emitting unit is a corrugated fin, and an outer surface of said insulator press-contacts a ridge portion of said corrugated fin.

7. A heating heat exchanger according to claim 6, wherein said positive electrode plate and said negative electrode plate include terminal portions for connecting to an outside electric circuit respectively.

8. A heating heat exchanger according to claim 7, wherein said terminal portions are integrally formed with said positive electrode plate and said negative electrode plate respectively.

9. A heating heat exchanger according to claim 7, wherein said terminal portions protrude from said positive electrode plate and said negative electrode plate toward an air downstream side of said heat-exchanging core portion.

10. A heating heat exchanger according to claim 6, further comprising a metal thin plate disposed between the outer surface of said insulator and the ridge portion of said corrugated fin of said electric heat emitting unit.

11. A heating heat exchanger according to claim 1, further comprising a tightening member for tightening said heat-exchanging core portion relative to said electric heat emitting unit.

12. A heat exchanger comprising:

a first heat exchanging core portion having a first plurality of tubes arranged in parallel and a first plurality of fin members disposed between adjacent tubes of said first tubes, said first plurality of fin members transferring heat from fluid flowing in said first tubes to air passing over said first plurality of fin members;

a second heat exchanging core portion having a second plurality of tubes arranged in parallel and a second plurality of fin members disposed between adjacent tubes of said second tubes, said second plurality of fin members transferring heat from fluid flowing in said second tubes to air passing over said second plurality of fin members; and an electric heat emitting unit disposed between said first and second heat exchanging cores, said electric heat emitting unit including a heat emitting element supported inside a frame by a heat unit fin member, said heat unit fin member transferring heat from said heat emitting element to air passing over said heat unit fin member.

\* \* \* \* \*